United States Patent
Strohrmann et al.

(10) Patent No.: US 10,612,938 B2
(45) Date of Patent: Apr. 7, 2020

(54) METHOD FOR OPERATING AN EVENT COUNTER

(71) Applicant: Robert Bosch GmbH, Stuttgart (DE)

(72) Inventors: Anna Christina Strohrmann, Reutlingen (DE); Gerhard Lammel, Tuebingen (DE); Rainer Dorsch, Dettenhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 258 days.

(21) Appl. No.: 15/317,658

(22) PCT Filed: Apr. 9, 2015

(86) PCT No.: PCT/EP2015/057648
§ 371 (c)(1),
(2) Date: Dec. 9, 2016

(87) PCT Pub. No.: WO2015/188961
PCT Pub. Date: Dec. 17, 2015

(65) Prior Publication Data
US 2017/0146363 A1  May 25, 2017

(30) Foreign Application Priority Data
Jun. 10, 2014  (DE) .................. 10 2014 210 980

(51) Int. Cl.
*G01C 22/00*  (2006.01)
(52) U.S. Cl.
CPC ................ *G01C 22/006* (2013.01)

(58) Field of Classification Search
CPC .................................... G01C 22/006
See application file for complete search history.

(56) References Cited

U.S. PATENT DOCUMENTS

| | | | | |
|---|---|---|---|---|
| 4,047,149 A * | 9/1977 | Akita | .............. | B60T 17/22 200/61.44 |
| 5,791,880 A * | 8/1998 | Wilson | .............. | A61M 5/14232 417/14 |
| 7,880,605 B2 * | 2/2011 | Leyden | .............. | G08B 13/1472 340/506 |
| 2005/0283300 A1 * | 12/2005 | Teulings | .............. | F02D 41/009 701/101 |
| 2011/0291832 A1 * | 12/2011 | Al-Kadi | .............. | G01V 8/20 340/541 |
| 2012/0092650 A1 * | 4/2012 | Gunn, III | .............. | G01N 21/7746 356/73 |

(Continued)

FOREIGN PATENT DOCUMENTS

| | | |
|---|---|---|
| CN | 1723848 A | 1/2006 |
| CN | 1258741 C | 6/2006 |
| CN | 1861227 A | 11/2006 |

(Continued)

*Primary Examiner* — Janet L Suglo
(74) *Attorney, Agent, or Firm* — Norton Rose Fulbright US LLP; Gerard Messina

(57) ABSTRACT

A method for operating an event counter, including the following: ascertaining at least one counting event with the aid of a signal from a first sensor; and using a signal from a second sensor for ascertaining the counting event if the signal from the first sensor is unable to be unequivocally allocated to a counting event.

9 Claims, 2 Drawing Sheets

(56) References Cited

U.S. PATENT DOCUMENTS

2013/0023740 A1* 1/2013 Kirchner ............... A61B 5/1116
                                                       600/301
2014/0069951 A1* 3/2014 Schmidt ............... A47K 5/1217
                                                       221/13

FOREIGN PATENT DOCUMENTS

| DE | 69322528 T2 | 6/1999 |
|----|-------------|--------|
| DE | 10040511 A1 | 9/2001 |
| JP | 2010218078 A | 9/2010 |

* cited by examiner

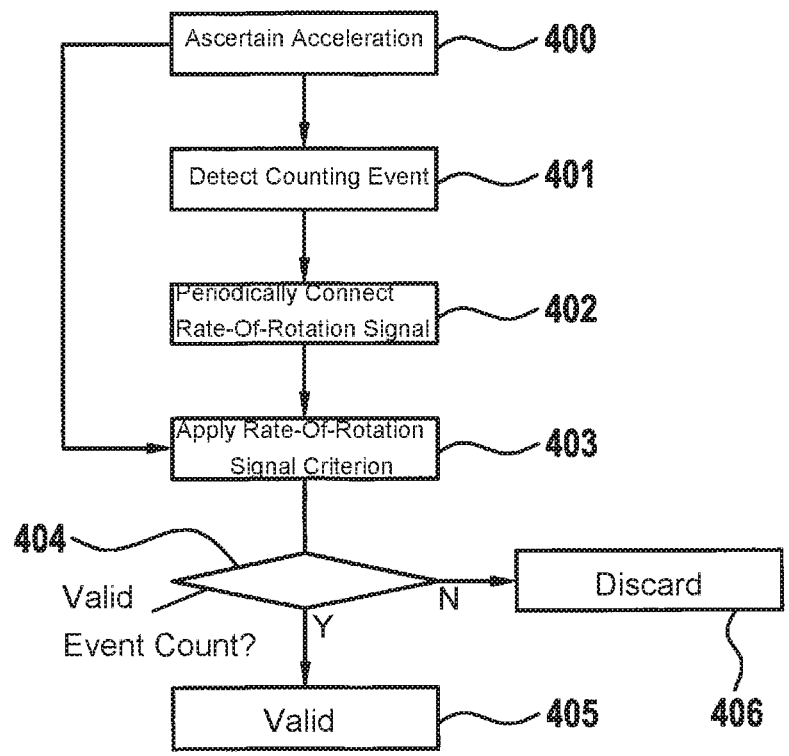
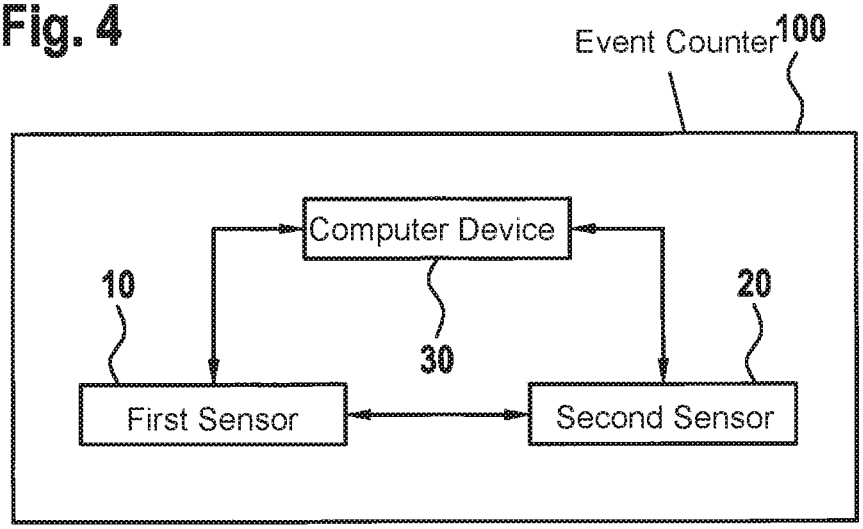

METHOD FOR OPERATING AN EVENT COUNTER

FIELD OF THE INVENTION

The present invention relates to a method for operating an event counter. Furthermore, the present invention relates to a device for counting events.

BACKGROUND INFORMATION

Event counters that are used for extracting step events from an acceleration signal are known from the related art. Such a step counter is discussed in the document EP 1 770 368 A1, for example. The extraction of the step events is based on a detection of a peak or a peak value of a signal. In most cases, the known systems use a sensor modality, e.g., in the form of an acceleration signal. This may result in a partially faulty detection of events if the event counter is subjected to driving motions that feature intense changes in direction (e.g., serpentine driving maneuvers) or if it is exposed to vibrations.

DISCLOSURE OF THE INVENTION

Therefore, it is an object of the present invention to provide an improved method for operating an event counter.

According to a first aspect, the object is achieved by a method for operating an event counter, the method having the following steps:

Ascertaining at least one counting event with the aid of a signal from a first sensor; and
Using a signal from a second sensor for ascertaining the counting event if the signal from the first sensor is unable to be unequivocally allocated to a counting event.

This advantageously makes it possible to detect or count only events that are actually also meant to be detected or counted. The second sensor is therefore connected only temporarily, so that it is ascertained in a highly reliable manner whether or not a counting event is at hand.

Specific embodiments of the method are the subject matter of the further descriptions herein.

In one advantageous further refinement of the method, the signal from the second sensor is used periodically across a service life of the event counter. This advantageously makes it possible to achieve a very high detection accuracy.

In another advantageous further refinement of the method, the signal from the second sensor is connected if a defined property of the signal from the first sensor is present. This makes it possible to perform a type of plausibilization that realizes an adaptive connection, in which the counting event is verified. A connection thus takes place only when it is assumed that a counting event has most likely taken place.

In one advantageous further refinement of the method, the defined property of the signal from the first sensor is one of: arithmetic mean value, standard deviation, a ratio of high to low value within a time period. In this way appropriate signal values are used for carrying out a plausibilization of the counting event.

In another advantageous further refinement of the method, a minimum time interval is observed between the connections of the signal from the second sensor. This advantageously eliminates scenarios in which situations are at hand that do not represent genuine counting events.

In another advantageous further refinement of the method, the signal from the second sensor is periodically connected only if the signal from the first sensor has a defined property. This enables a maximum detection quality and energy savings because the second sensor is periodically connected only if it is highly likely that a counting event is present.

According to another advantageous further refinement of the method, related different operating modes of the event counter are thereby able to be adjusted. This may be undertaken by a user of the event counter, for instance.

In another advantageous further refinement of the method, the first sensor is an acceleration sensor and the second sensor is a rate-of-rotation sensor. Signals from sensors are thereby used that lend themselves very well to the differentiation of counting events.

According to another advantageous further refinement of the method, the event counter is a step counter. The plausibilization of step events can be used to particular advantage in this type of event counter because the step counter is often used in ambiguous situations that do not represent counting events.

In the following text, the present invention will be described with further features and advantages on the basis of a plurality of figures. All of the features, regardless of their presentation in the description or in the figures, and regardless of their antecedent references in the patent claims, form the subject matter of the present invention.

BRIEF DESCRIPTION OF THE DRAWINGS

FIG. 3 shows a further variant of a sequence of the method of the present invention.

FIG. 4 shows a specific embodiment of an event counter according to the present invention.

DETAILED DESCRIPTION

In methods from the related art, an absolute amount of an acceleration is calculated from a signal of an acceleration sensor. Peak values are subsequently detected, and a minimum time interval between the peak values is observed for checking a plausibility. However, this known method may disadvantageously lead to a high number of incorrect or faulty detections, for instance because of jolting during the vehicle operation to which the event counter is exposed.

For suppression, and thus for increasing the detection accuracy, the use of a rate-of-rotation sensor is proposed, which is connected only temporarily and, in particular, is connected only when a likelihood of a counting event exists.

In this manner, a scenario of "driving an automobile" can be identified from a combination of the sensor signals of the acceleration sensor and the rate-of-rotation sensor. To do so, properties of the sensor signal from the acceleration sensor are ascertained or extracted. For example, these properties could be a mathematical mean value, a standard deviation, a relation of high to low values within a time segment, etc.

In order to minimize an electrical energy consumption of the overall system, the rate-of-rotation sensor as electrical main consumer is connected as rarely as possible. This may be done in various manners, which are described in the following text.

Figure 1:
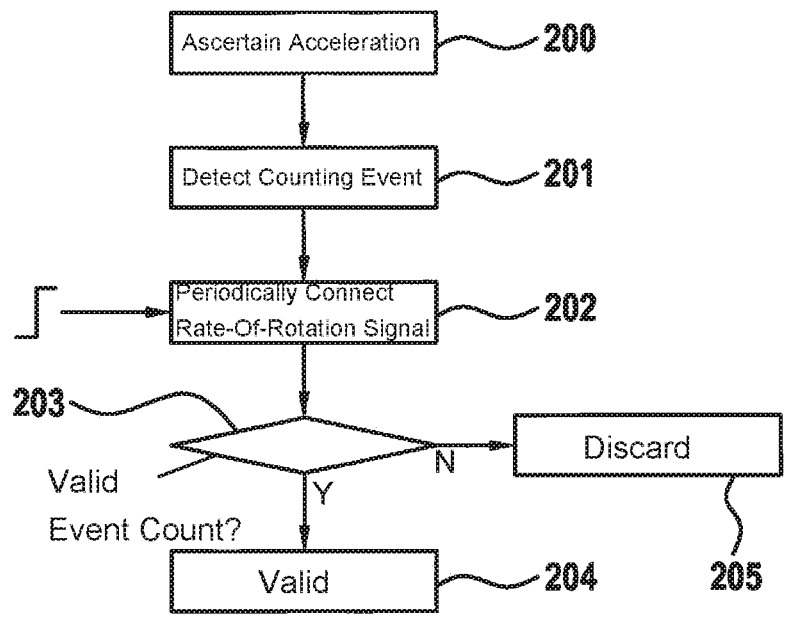
FIG. 1 shows a first specific embodiment of a sequence of a method according to the present invention.

FIG. 1 essentially shows that the rate-of-rotation sensor is periodically switched on in a fixed time-slot pattern and the criterion for the counting of steps is checked ("periodic variant").

In a step 200, a value of an acceleration is ascertained. In a step 201, a counting event such as a step is detected, which is buffer-stored in a step 202. In a step 202, a signal from a rate-of-rotation sensor is periodically connected. In a step 203, it is then decided whether the event count is valid (step 204) or will be discarded (step 205). For example, it is possible to implement the periodic connection of the signal from the rate-of-rotation sensor, executed in step 202, once per second or once per minute, distributed across an entire service life of the event counter. Of course, any connection time periods that are deemed advantageous are conceivable.

The described method thus connects the signal from the rate-of-rotation sensor on a regular basis, which may actually cause a certain increase in the electrical consumption for the event counter, but allows the realization of a very precise operating behavior of the event counter.

Figure 2:
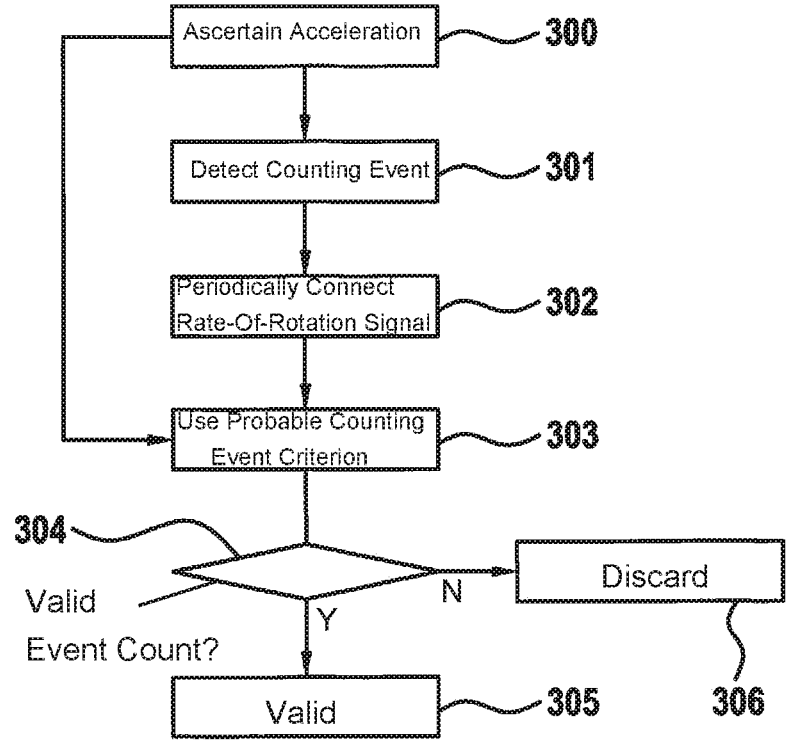
FIG. 2 shows a further variant of a sequence of the method of the present invention.

A variation of the method is shown in principle in the flow diagram of FIG. 2, the rate-of-rotation sensor being used adaptively as a function of a signal from the acceleration sensor in this case ("adaptive variant"). This advantageously makes it possible to reduce the energy consumption for the rate-of-rotation sensor when the criterion for switching on the rate-of-rotation sensor is not met most of the time. Steps 300 through 302 correspond to steps 200 to 202 in FIG. 1. In a step 303, a criterion is used that corresponds to a counting event that appears probable. In a step 304, a decision is then made whether the event count is valid (step 305) or will be discarded (step 306).

Another variant of the method is shown in principle in FIG. 3. Steps 400 through 402 correspond to steps 200 through 202 of FIG. 1 or to steps 300 through 302 of FIG. 2. In a step 403, the criterion of the signal from the rate-of-rotation sensor is applied periodically, and in a step 404, a decision is made whether the counting event is valid (step 405) or will be discarded (step 406).

It is therefore clear from FIG. 3 that the method constitutes an adaptive-periodic variant, in which the signal from the rate-of-rotation sensor is periodically connected at times when a connection criterion is satisfied, in order to further reduce the energy consumption. In this manner, a minimal electrical energy consumption is able to be achieved by this variant.

In an advantageous manner, a selection of the three different operating modes of the event counter described in FIGS. 1 through 3 can be set either by a user, for instance via a selection with regard to a related electrical energy consumption. Another option is a fixed allocation of the operating mode to a design of the event counter, for instance in the form of a tablet, a smartphone, a sport wristband, a fitness tracker, etc.

FIG. 4 schematically illustrates an event counter 100 in a highly simplified manner. It can be seen that event counter 100 includes a first sensor 10 in the form of an acceleration sensor and a second sensor 20 in the form of a rate-of-rotation sensor. Signals from said sensors 10, 20 are exchanged among the sensors, and/or supplied to a computer device 30 (e.g., a microcontroller or an ASIC), the signal from the rate-of-rotation sensor being connected only temporarily for an ascertainment of counting events, and as a function of certain criteria.

The method of the present invention may advantageously be implemented as an algorithm of a software program for computer device 30; certain restrictions with regard to the specific development of the algorithm may possibly exist as a function of form factors.

In summary, the present invention provides an improved method for operating an event counter, by which it is advantageously possible to increase a detection accuracy of counting events, while a related additional electrical energy consumption is minimized.

For this purpose, the step counter is supplemented by various plausibility queries. If the information received from the acceleration sensor is insufficient to carry out a complete plausibility check, then at least one additional sensor, such as the rate-of-rotation sensor, is connected as well. Of course, it is also possible to use signals from a plurality of sensors for the plausibility checks.

The detection accuracy can advantageously be optimized in this manner, while keeping the additional electrical energy consumption as low as possible. Overall, the method of the present invention makes it possible to suppress, or at least minimize, a "false positive detection" of step events, in which steps are counted or detected only if they are also actually occurring. In the event that no steps are at hand, they will also not be counted or detected. This contributes to an optimal parameterization of the step counter.

Although the present invention has been described in the preceding text with the aid of specific exemplary embodiments, it is by no means restricted to these embodiments. One skilled in the art will therefore be able to modify the afore-described features in a suitable manner or combine them with one another without departing from the core of the present invention.

What is claimed is:

1. A method for operating an event counter, the method comprising:
   ascertaining at least one counting event with the aid of a signal from a first sensor responsive to a physical movement; and
   using a signal from a second sensor for ascertaining the counting event if the signal from the first sensor is unable to be unequivocally allocated to a counting event, the second sensor being responsive to the physical movement, wherein the signal from the second sensor is periodically connected only if the signal from the first sensor has a defined property, wherein the defined property of the signal from the first sensor is one of: arithmetic mean value, standard deviation, ratio of high to low value within a time period.

2. The method of claim 1, wherein the signal from the second sensor is used periodically across a service life of the event counter.

3. The method of claim 2, wherein a minimum time interval is observed between first connection of the second sensor and a second connection of the second sensor.

4. The method of claim 1, wherein related different operating modes of the event counter are adjustable.

5. The method of claim 1, wherein the first sensor is an acceleration sensor and the second sensor is a rate-of-rotation sensor.

6. The method of claim 1, wherein the event counter includes a step counter.

7. A device for counting events, comprising:
   a first sensor responsive to a physical movement; and
   a second sensor responsive to the physical movement;
   wherein a signal from the first sensor is used for ascertaining counting events, and a signal from the second sensor is use-able for ascertaining the counting events if the signal from the first sensor is unable to be unequivocally allocated to a counting event, wherein the signal from the second sensor is periodically connected only if the signal from the first sensor has a defined property, wherein the defined property of the signal from the first sensor is one of: arithmetic mean value, standard deviation, ratio of high to low value within a time period.

8. The device of claim 7, wherein the first sensor includes an acceleration sensor and the second sensor includes a rate-of-rotation sensor.

9. A non-transitory computer readable medium having a computer program, which is executable by a processor, comprising:

a program code arrangement having program code for operating an event counter, by performing the following:

ascertaining at least one counting event with the aid of a signal from a first sensor responsive to a physical movement; and using a signal from a second sensor for ascertaining the counting event if the signal from the first sensor is unable to be unequivocally allocated to a counting event, the second sensor being responsive to the physical movement, wherein the signal from the second sensor is periodically connected only if the signal from the first sensor has a defined property, wherein the defined property of the signal from the first sensor is one of: arithmetic mean value, standard deviation, ratio of high to low value within a time period.

* * * * *